April 4, 1939. G. T. BALFE 2,152,630
GASKET
Filed Dec. 9, 1936
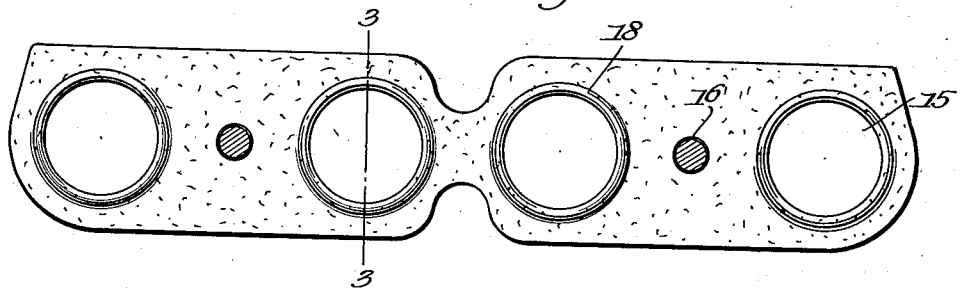
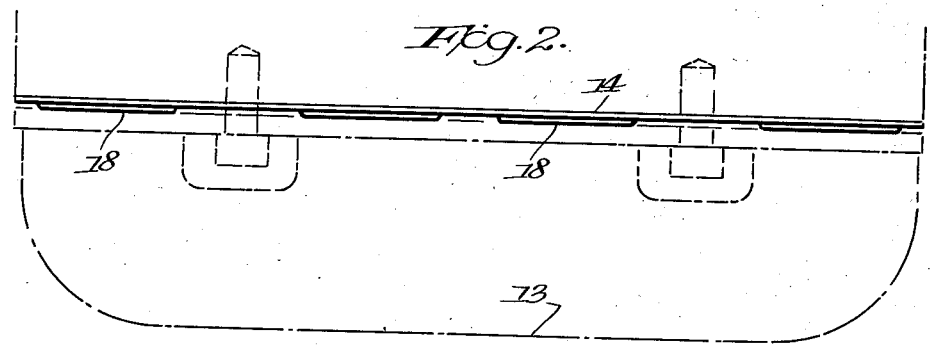
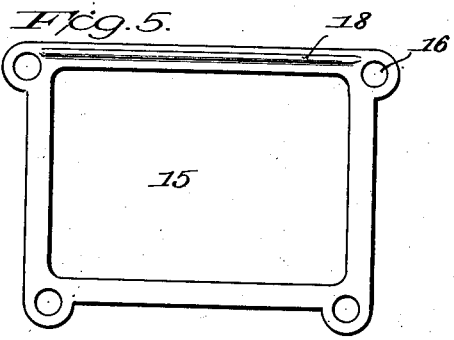
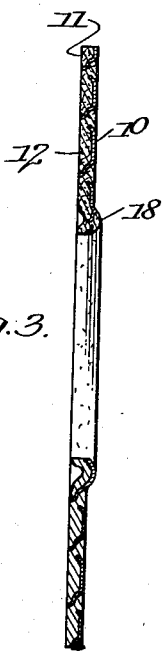
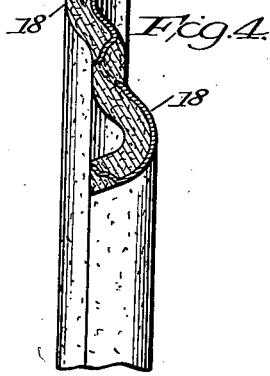
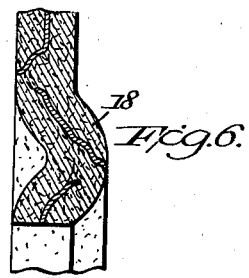
Inventor
George T. Balfe.
By Cushman Darby & Cushman
Attorneys Patented Apr. 4, 1939

2,152,630

UNITED STATES PATENT OFFICE 2,152,630

GASKET

George T. Balfe, Detroit, Mich., assignor to Detroit Gasket & Manufacturing Company, Detroit, Mich., a corporation of Michigan Application December 9, 1936, Serial No. 115,020

1 Claim. (Cl. 288—1)

This invention relates to gaskets, particularly useful for automotive purposes, but generally applicable wherever a tight and leakproof joint is required.

There is frequently encountered in the case of manifold gaskets a condition where the usual gasket, because of warping of the manifold, improper spacing of the bolts or other irregularities in the sealing surfaces of the block and manifold, does not form a thoroughly effective seal. This difficulty is not so pronounced about the bolts where the tightening effect is immediate, but at points remote from the bolts, there frequently occurs a space between the contact surfaces which is wider than the gasket when the parts are tightened and there is otherwise non-uniformity in the space between the sealing surfaces such that the gasket cannot accomplish its sealing function.

It is the object of the present invention to provide a gasket which, under the conditions recited, will form a leakproof seal between the joint or contact surfaces. I attain this result by embossing or pressing a metal-cushion layer gasket constructed in accordance with my United States Patents Nos. 1,927,450 and 1,776,140 to form a linear projection or projections at any required point. Such a projection will increase the overall thickness of the gasket, will be resilient, and at the same time, due to the presence of the metal, will have sufficient rigidity to withstand distortion strains. The projection may be disposed about the service openings, about the periphery of the gasket, or be disposed between the latter and the edges of the service openings.

Referring to the drawing:

Figure 1 is a top plan view of the gasket.

Figure 2 is a side elevation showing the gasket having projections surrounding the service openings applied to the joint between the manifold and block of an internal combustion engine. This application is by way of representation since the gasket is useful in connection with various types of joints.

Figure 3 is a sectional view on the line 3—3 of Figure 1.

Figure 4 is an enlarged sectional view similar to Figure 3 and showing the projections pressed up on opposite sides of the gasket.

Figure 5 is a top view of another form of gasket in which the projection extends in a line between the service opening and the outer edge of the gasket.

Figure 6 is a sectional view of a part of a gasket construction in accordance with this invention, wherein cushion material is disposed on opposite sides of the metal layer.

In Figure 3 I have illustrated a gasket constructed in accordance with my aforesaid patents and including a metal layer 10 having on one side projections 11 embedded in a cushion layer 12. It is to be understood that the cushion material may be upon both sides of the metal layer 10 as in Figure 6, but for purposes of illustration and in one form of the invention the cushion material is employed upon one side only. The gasket illustrated in Figure 1 is of the manifold type, and referring to Figure 2, is positioned between the manifold 13 and the block 14 of an internal combustion engine. The gasket is disposed with the cushion side 12 thereof adjacent the contact surface of the block 14 and with the metal layer adjacent the contact surface of the manifold 13.

The service openings of the gasket are indicated at 15 and the bolt openings at 16. Referring to Figures 1 and 2, it will be noted that normally a wide span or distance exists between the bolts, and between the bolts and sides and ends of the joint. Under such circumstances, if warping is present, or there is any improper spacing of the bolts, or either or both sealing surfaces are characterized by inequalities, a gasket as usually constructed fails to properly seal the joint. It is necessary, therefore, to provide for such contingencies in a thoroughly reliable manner. While the joint surfaces around the bolt openings will, in some instances, engage the gasket upon tightening of the bolts and form a seal, it is frequently the case that at the more remote points from the bolts the contact surfaces of the joint are wider apart than the thickness of the gasket, or there is such non-uniform spacing between the contact surfaces, that the joint is incapable of being sealed.

With the present invention, and referring to Figure 1, the objectionable condition above explained is overcome by pressing the laminated gasket to form a linear projection 18. This projection is shown in Figure 1 as extending around all four of the service openings 15, while in Figure 5 it is shown as a straight line extending between the service opening and the peripheral edge of the gasket. As many projections are employed as necessary, e. g., in the case of Figure 1, a projection may be formed about one, two, three or four of the service openings, and in the case of Figure 5, the projection may be disposed along one side or both sides, or along one end or both ends, and there may be projections completely surrounding the opening. While I have shown the projections as being continuous, they may be spaced apart and extend in a single line or be disposed concentrically, in parallel relation, or in a diagonal or angular relation.

Moreover, the projections may extend from opposite sides of the gasket as best illustrated in Figure 4, the projections 18 there being arranged in concentric relation.

Referring to Figure 6, the gasket is shown as provided with cushion layers upon opposite sides of the metal layer, and will be subject to similar construction and modification as described in connection with the gasket having a single cushion layer.

The projections 18, it will be noted, are relatively narrow and present a curved surface on one side of the gasket, forming a groove on the opposite side of the gasket. The projection is resilient, but by reason of the presence of the metal layer, has substantial rigidity and does not deform or distort under pressure.

Further, it will be observed that the projections are of a height to increase the overall thickness of the gasket in a manner to accommodate the gasket to any wide or non-uniform spacing, as well as pits, grooves or inequalities in one or both sealing surfaces, thereby assuring that at the hot spot or wherever an inequality exists, the joint will be thoroughly and permanently sealed.

While in Figure 3 I have shown the projection 18 as pressed up on the metal side 10, which is preferred where a single cushion layer is used, in some cases the projection may be pressed up on the cushion side.

It is to be understood that the forms of the invention shown and described are merely illustrative of preferred embodiments, and that such changes may be made as fall within the purview of one skilled in the art without departing from the spirit of the invention and the scope of the appended claim.

I claim:

In a gasket having a service opening therein and bolt openings and formed of a layer of metal and a coextensive layer of cushion material with the metal layer having projections struck up therefrom and embedded in the cushion layer, means to compensate for irregularities around the service opening comprising a rib-like embossment pressed up in the composite material of the gasket about said opening to provide for an initial sealing engagement of the gasket before the final seating of the parts to be sealed on the gasket.

GEORGE T. BALFE.